United States Patent
Bridges, III et al.

(10) Patent No.: US 6,860,287 B2
(45) Date of Patent: Mar. 1, 2005

(54) VARIABLE FLOWRATE REGULATOR

(75) Inventors: John E. Bridges, III, Pomona, CA (US); Kenji A. Kingsford, Devore, CA (US)

(73) Assignee: Saint-Gobain Performance Plastics Corporation, Wayne, NJ (US)

(*) Notice: Subject to any disclaimer, the term of this patent is extended or adjusted under 35 U.S.C. 154(b) by 153 days.

(21) Appl. No.: 10/192,865

(22) Filed: Jul. 10, 2002

(65) Prior Publication Data

US 2004/0007268 A1 Jan. 15, 2004

(51) Int. Cl.[7] .............................................. G05D 16/06
(52) U.S. Cl. ............................ 137/505.34; 137/505.41
(58) Field of Search ...................... 137/505.26, 505.29, 137/505.34, 505.37, 505.41

(56) References Cited

U.S. PATENT DOCUMENTS

| | | | | |
|---|---|---|---|---|
| 151,210 A | * | 5/1874 | Edwards ................. | 137/505.41 |
| 2,287,992 A | * | 6/1942 | Grove .................... | 137/505.37 |
| 2,358,819 A | * | 9/1944 | Morris .................... | 137/484.8 |
| 2,487,650 A | * | 11/1949 | Grove et al. ........... | 137/505.11 |
| 2,625,954 A | * | 1/1953 | Klein .................... | 137/505.42 |
| 2,737,202 A | * | 3/1956 | Baldwin, Jr. et al. .... | 137/505.41 |
| 4,016,905 A | * | 4/1977 | Marlatt, Sr. ............ | 137/505.41 |
| 5,595,209 A | * | 1/1997 | Atkinson et al. ....... | 137/505.11 |
| 6,079,434 A | * | 6/2000 | Reid et al. ............. | 137/505.37 |

* cited by examiner

*Primary Examiner*—Stephen M. Hepperle
(74) *Attorney, Agent, or Firm*—Jeffer, Mangels, Butler & Marmaro LLP

(57) ABSTRACT

Variable flowrate regulators of this invention r comprises a regulator body having a fluid transport chamber disposed therethrough. Fluid inlet and outlet ports are in fluid flow communication with the chamber, and a valve seat is positioned at one end of the chamber. A diaphragm housing is attached to the body and has a diaphragm chamber in fluid flow communication with the fluid transport chamber. A diaphragm is disposed within the diaphragm chamber. A one-piece poppet assembly is attached to the diaphragm and is disposed within the body. The poppet assembly comprises a head that has a diameter sized greater than that of the valve seat for providing a leak-tight seal thereagainst when placed in a closed position. The poppet assembly also comprises a plurality of orifices positioned downstream from the head for passing fluid into the fluid transport chamber when the head is unseated from the valve seat. The plurality of orifices is positioned concentrically within the fluid transport chamber.

31 Claims, 4 Drawing Sheets

VARIABLE FLOWRATE REGULATOR

FIELD OF THE INVENTION

This invention relates to regulators useful for providing a desired reduced output pressure of a fluid that is supplied at a generally higher supply pressure and, more particularly, to regulators that are specially designed to regulate or control fluid outlet pressure in a manner that eliminates or greatly minimizes undesired internal harmonic chatter and the undesired noise and wear associated therewith.

BACKGROUND OF THE INVENTION

Fluid pressure regulators are devices known in the art that are used to reduce the pressure of a fluid provided at a supply pressure to a desired outlet pressure, useful for the subsequent handling of the fluid. In an example application, a regulator can be used to reduce the supply pressure of a chemically aggressive and/or high-purity fluid, used for example in the semiconductor manufacturing industry, to a desired output pressure that is suitable for dispensing the fluid for subsequent handling.

Fluid pressure regulators typically include an internal diaphragm that serves to control the outlet pressure of the fluid entering the regulator via pressure differential imposed across the diaphragm. A first pressure imposed on one side of the diaphragm is consistent with a set-point pressure. This set-point pressure can either be applied pneumatically or mechanically. A second pressure imposed on an opposite side of the diaphragm is that provided by fluid entering the regulator at a supply pressure. The diaphragm is typically attached to a valve member that is opened or closed by the pressure differential that is applied across the diaphragm.

It is known that during operation of such above-described regulators that the internal members are prone to undesired oscillation. Specifically, the diaphragm and/or valve member are known to chatter during passage of the fluid through the regulator at certain fluid flowrates that produce a harmonic oscillating frequency. The harmonic oscillation of internal regulator members is not desired as it produces both an undesired noise and causes accelerated wear of the internal components, such as the diaphragm and/or the valve member. Further, the harmonic oscillation produced within the regulator can travel to other fluid handling members in the fluid transport system, such as valves and pipes that are attached to the regulator, which can either cause damage to these attached members or interfere with proper operation of the same.

It is, therefore, desired that a fluid regulator be constructed in a manner that eliminates or greatly minimizes the possibility of internal harmonic oscillation during operation. It is also desired that such a regulator be configured to enable its operation with chemically aggressive and/or high-purity fluids without degrading or otherwise functioning in a manner that could introduce contaminate material into the fluid. It is further desired that such regulator be constructed in a manner that reduces the number of fluid leak paths therethrough, thereby reducing the possibility of chemical leakage to the outside environment.

SUMMARY OF THE INVENTION

A variable flowrate fluid pressure regulator is constructed in a manner that eliminates or greatly minimizes the possibility of internal harmonic oscillation during operation, thereby minimizing and/or eliminating internal regular damage caused therefrom, and extending useful regular service. The regulator comprises a regulator body having a fluid transport chamber disposed therethrough. Fluid inlet and outlet ports are in fluid flow communication with the chamber, and a valve seat is positioned at one end of the chamber. A diaphragm housing is attached to the body and has a diaphragm chamber in fluid flow communication with the fluid transport chamber. A diaphragm is disposed within the diaphragm chamber.

A one-piece poppet assembly is attached to the diaphragm and is disposed within the body. The poppet assembly comprises a head that has a diameter sized greater than that of the valve seat for providing a leak-tight seal thereagainst when placed in a closed position. The poppet assembly also comprises a plurality of orifices positioned downstream from the head for passing fluid into the fluid transport chamber when the head is unseated from the valve seat. The plurality of orifices is positioned concentrically within the fluid transport chamber. The regulator includes means for controlling the diaphragm and poppet assembly to produce a desired outlet fluid pressure.

Pressure regulators of this invention are formed from materials that enable operation with hemically aggressive and/or high-purity fluids without degrading or otherwise functioning in a manner that could introduce contaminate material into the fluid. Pressure regulators of this invention are also constructed having a minimum number of fluid leak paths therethrough, thereby reducing the possibility of chemical leakage to the outside environment.

DESCRIPTION OF THE DRAWINGS

These and other features, aspects, and advantages of the present invention will be more fully understood when considered with respect to the following detailed description, appended claims, and accompanying drawings, wherein:

DETAILED DESCRIPTION OF THE INVENTION

Variable flowrate regulators, constructed in accordance with the practice of this invention, comprise a one-piece poppet assembly that is positioned within a regulator body. The poppet assembly is a one-piece member configured having a poppet head that interacts with a valve seat in the body, and having a plurality of orifices disposed through a sleeve of the poppet positioned axially between the poppet head and a poppet sealing lip. The poppet assembly is sealably attached to the body and includes a movable thin-walled section to enable rolling axial displacement of the poppet within the body.

Configured in this manner, the poppet assembly serves to control fluid passage through the regulator via the plurality of orifices, thereby eliminating or greatly minimize the possibility of poppet harmonic oscillation within the regulator during operation. Additionally, regulators of this invention include wetted parts that are formed from fluoropolymeric materials to resist undesired degradation from exposure to chemically aggressive process fluids.

Figure 1:
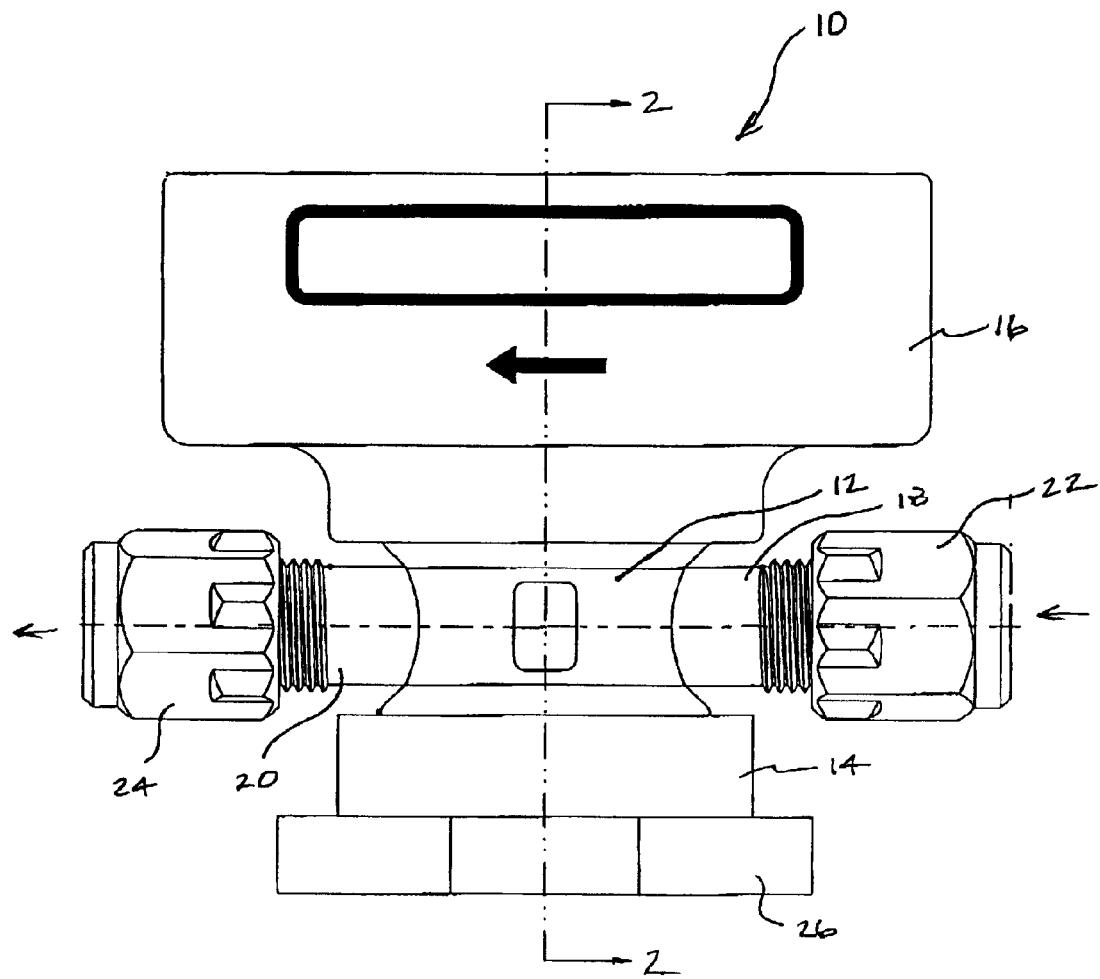
FIG. 1 is a side view of a variable flowrate regulator constructed according to principles of the present invention.

Referring to FIG. 1, an example embodiment variable flowrate regulator 10 provided in accordance with practice of the present invention comprises a regulator body 12, a bottom cap 14 attached to a bottom portion (with reference to FIG. 1) of the body 12, and a diaphragm housing 16 attached to a top portion of the body. The body 12 includes a fluid inlet port 18 extending through a body sidewall portion, for receiving fluid into the regulator, and a fluid outlet port 20 extending through an opposite body sidewall portion, for removing fluid from the regulator. The fluid inlet and outlet ports are configured to accommodate attachment with complementary fittings 22 and 24, respectively, to permit attachment of the regulator within a fluid handling system. A positioning ring 26 is attached to the bottom cap 14 to facilitate mounting the regulator to a desired structure.

Figure 2:
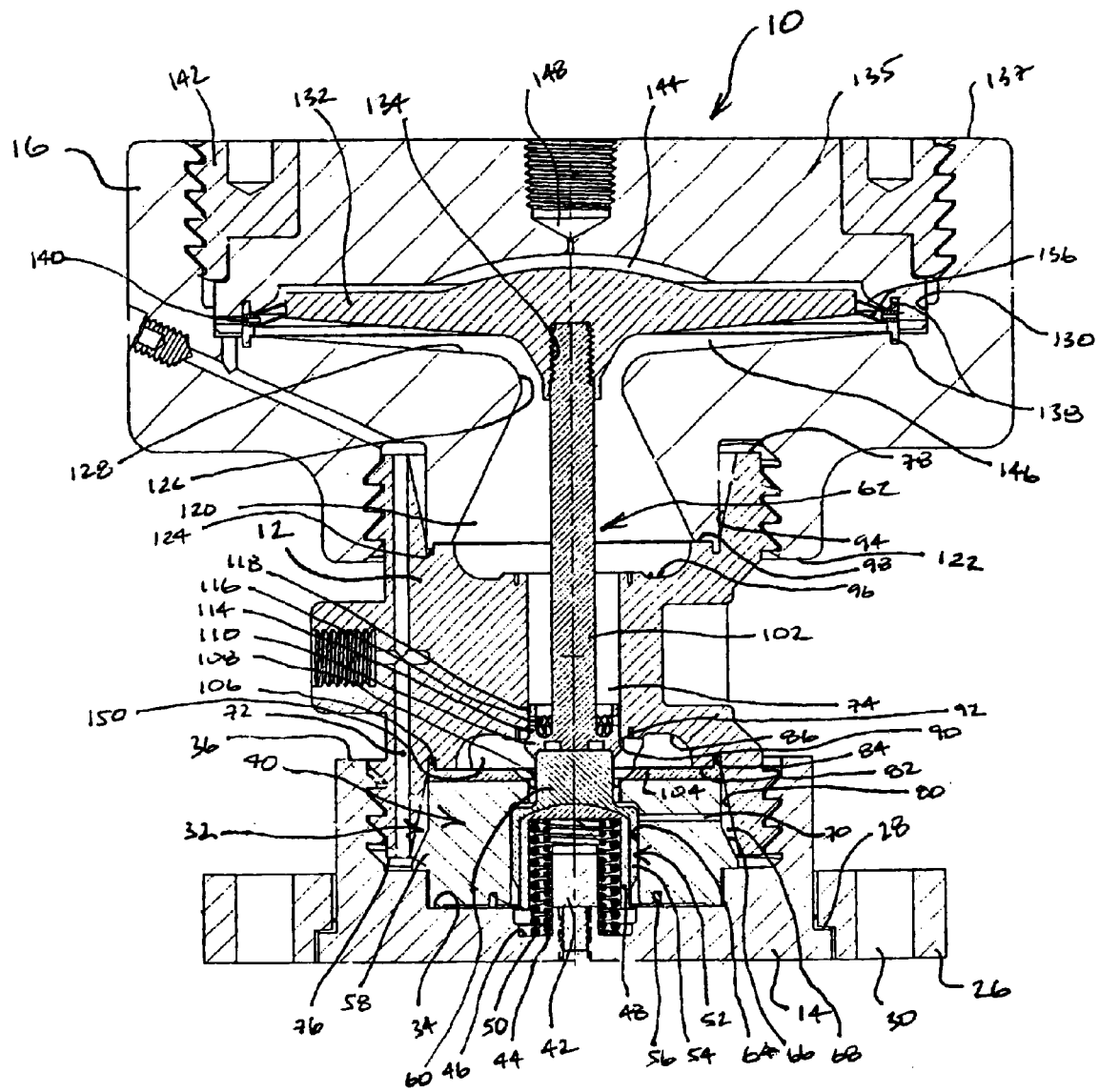
FIG. 2 is a cross-sectional side view taken along section 2—2 of the variable flowrate regulator of FIG. 1 in a closed operating condition for controlling the passage of fluid therethrough.

Referring to FIGS. 1 and 2, moving from the bottom of the figures upwardly, the flowrate regulator positioning ring 26 is shown disposed around an outside diameter of the bottom cap 14, and operates to retain the cap against a supporting surface by interaction of a cap shoulder 28 against the ring. The ring 26 includes one or more openings 30 disposed therethrough for accommodating mounting bolts (not shown) or other conventional mounting means therein.

The bottom cap 14 includes a central chamber 32 that extends axially along a central axis running through the cap from a base 34 to an open end 36. The bottom cap includes a spring assembly 40 disposed within the central chamber that provides a desired urging force onto a head portion of a spring containment member (52—described below) to maintain contact between such 35 head portion and a poppet head (110—described below), thus supporting an axially directed movement of a poppet assembly within the regulator. The spring assembly 40 also functions to place the poppet assembly in a sealed positioned within the body in the absence of suitable downstream pressure, i.e., fluid pressure in chamber 146. The spring assembly 40 comprises an inner spring guide 42 that is centrally positioned within the chamber 32, and that projects axially upwardly away from the base 34 a determined length. A first spring 44 is positioned concentrically around an outside surface of the inner spring guide 42 and is interposed axially between a groove 46 recessed into the base, at one spring end, and an outer spring guide 48, at an opposite spring end. A second spring 50 is disposed concentrically around the first spring 44.

Like the first spring 44, the second spring is also interposed axially between the base groove 46 and the outer spring guide 48.

The outer spring guide 48 includes a cylindrically-shaped side wall surface that extends axially from an open end, positioned adjacent the base 34, to a closed end having a convex-shaped top surface. Together, the inner and outer spring guides 42 and 48 operate to contain the springs within a fixed annular space defined therebetween for providing a defined travel path that prevents undesired binding or other impairment to proper axial spring movement.

A one-piece spring containment member 52 is positioned concentrically around an outside surface of the outer spring guide 48, and includes a cylindrically-shaped side wall surface 54 that extends axially away from a radial flange 56. The radial flange 56 defines a peripheral edge of the spring containment member and includes a tongue that projects axially therefrom a determined distance. As discussed below, the flange tongue is disposed within a groove disposed within a poppet support 58. The side wall surface 54 includes a thin-walled section bridging the flange. The spring containment member is positioned within the central chamber 32 such that the flange wall surface thin-walled section is positioned axially adjacent the groove 46. This placement is important as it provides room for the thin-walled section to roll axially as the springs are compressed and the outer spring guide 48 and containment member 52 are each moved axially toward the base 34. The thin-walled section is supported by, and rolls on and off of, the adjacent outside surface of the outer spring guide 48.

Although the spring containment member 52 has been described and illustrated as having a wall surface with a rolling thin-walled section, it is to be understood that the containment member can be configured differently to accommodate axial spring movement within the central chamber. For example, the spring containment member can includes a wall surface having a bellow or accordion-type configuration to permit the desired axial movement. The spring containment member 52 includes a closed end having a solid head 60 that projects axially upwardly a distance. As will be discussed below, the head is configured to contact and provide a supporting surface for the poppet assembly 62.

An annular poppet support 58 is disposed within the central chamber 32 and includes a central opening 64 that extended therethrough from a first axial end, positioned adjacent the base 34, to a second axial end, positioned adjacent the poppet assembly 62. As mentioned above, the poppet support first axial surface includes a circular groove recessed therein that is sized to accommodate placement of the tongue from the radial flange 56 therein. In a preferred embodiment, the groove is sized having a width that is slightly smaller than the thickness of the tongue to provide a leak-tight interference fit therebetween.

The central opening 64 comprises two differently sized diameter sections; namely, a first diameter section that extends a distance axially away from the first axial end, and a second diameter section that extends from the first diameter section to the second axial end. The first diameter section is positioned concentrically around the spring containment member 52, and is configured to permit free axial movement of the spring containment member therein. The second diameter section is sized smaller than the first diameter section and is positioned concentrically around spring containment member head 60. As will be discussed below, the second diameter section is sized slightly larger than the head to both permit its free axial movement therein and to accommodate placement and rolling movement of a poppet assembly 62 thin-walled section therein.

The annular poppet support 58 comprises an outside wall surface 66 that is configured to provide an open space 68 within the central chamber 32. The annular poppet support 58 further includes a fluid passage 70 that extends radially from the central opening 64 first diameter section to the outside wall surface 66, for routing any fluid that has leaked into the central chamber to a leak detection port 72 within the regulator body.

The regulator body 12 includes a fluid transport chamber 74 extending axially therethrough between opposed first and second axial ends 76 and 78. Each of the body first and second axial ends includes a threaded outside surface for accommodating threaded attachment with the respective bottom cap 14 and the diaphragm housing 16. Specifically, the body first axial end 76 is threadably attached to a complementary threaded wall of the bottom cap 14. The regulator body includes an open section adjacent the first axial end that as defined by generally cylindrical inside wall surface 80. The inside wall surface 80 is sized and configured to accommodate placement of the poppet support 58 therein. The body inside wall surface is also sized and configured to provide the open space 68 necessary to facilitate the passage of leaking fluid from the poppet support 58.

Moving upwardly within the body from the first axial end 76, the inside wall surface includes a shoulder 82, as defined by a narrowed diameter, that includes a recessed circular groove 84. As will be discussed below, the groove is sized and configured to retain a tongue therein that projects outwardly away from the poppet assembly for providing a leak-tight attachment therewith.

Figure 3:
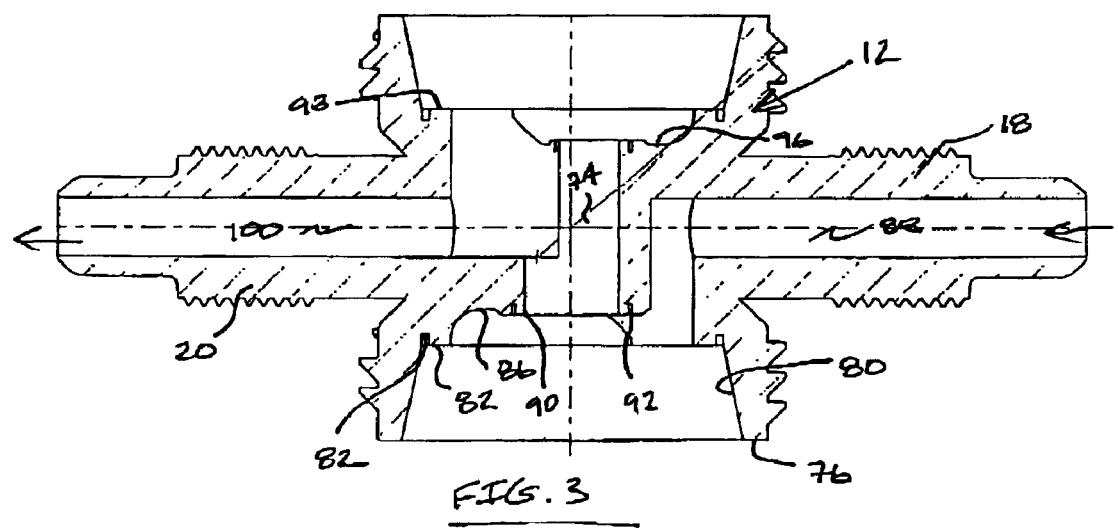
FIGS. 3 is a cross-sectional side view of a regulator body from the variable flowrate regulator of FIGS. 1 and 2.

Moving radially inwardly from the shoulder 82, the body inside wall surface includes a inlet fluid cavity 86 that is recessed into the body axially and positioned a distance away from the shoulder 82. As best shown in FIG. 3, the inlet fluid cavity 86 is in fluid flow communication with the fluid inlet port 18 via a fluid inlet passage 88 that first enters the body in a radial direction and then passes axially downwardly to merge with the inlet fluid cavity.

The inlet fluid cavity 86 extends radially inwardly a distance into the body until reaching the fluid transport chamber 74, which has a diameter that is less than that of the inlet fluid cavity. The body includes a circular valve seat 90 that is interposed radially between the inlet fluid cavity and the fluid transport chamber, defining the entrance to the fluid transport chamber 74. In a preferred embodiment, the valve seat is integral with the body, i.e., is molded or machined from part of the both itself. In an example embodiment, the body includes a recessed groove 92 that is disposed concentrically around the valve seat. The recessed groove 92 acts as a relief to provide a small degree of valve seat movement to improve conformance between the valve seat and an interfacing portion of the poppet assembly, to thereby ensure a leak-tight seal therebetween.

The fluid transport chamber 74 extends axially a distance through the regulator body to the body second axial end 78. Moving axially away from the fluid transport chamber towards the second axial end, the body includes an inside wall surface 94 defined by a fluid cavity 96 and a shoulder 98. As best shown in FIG. 3, the fluid transport chamber 74 is in fluid flow communication with the fluid outlet port 20 via a fluid outlet passage 100 that first passes axially within the body from the fluid transport chamber, and then passes radially through the body.

Figure 4:
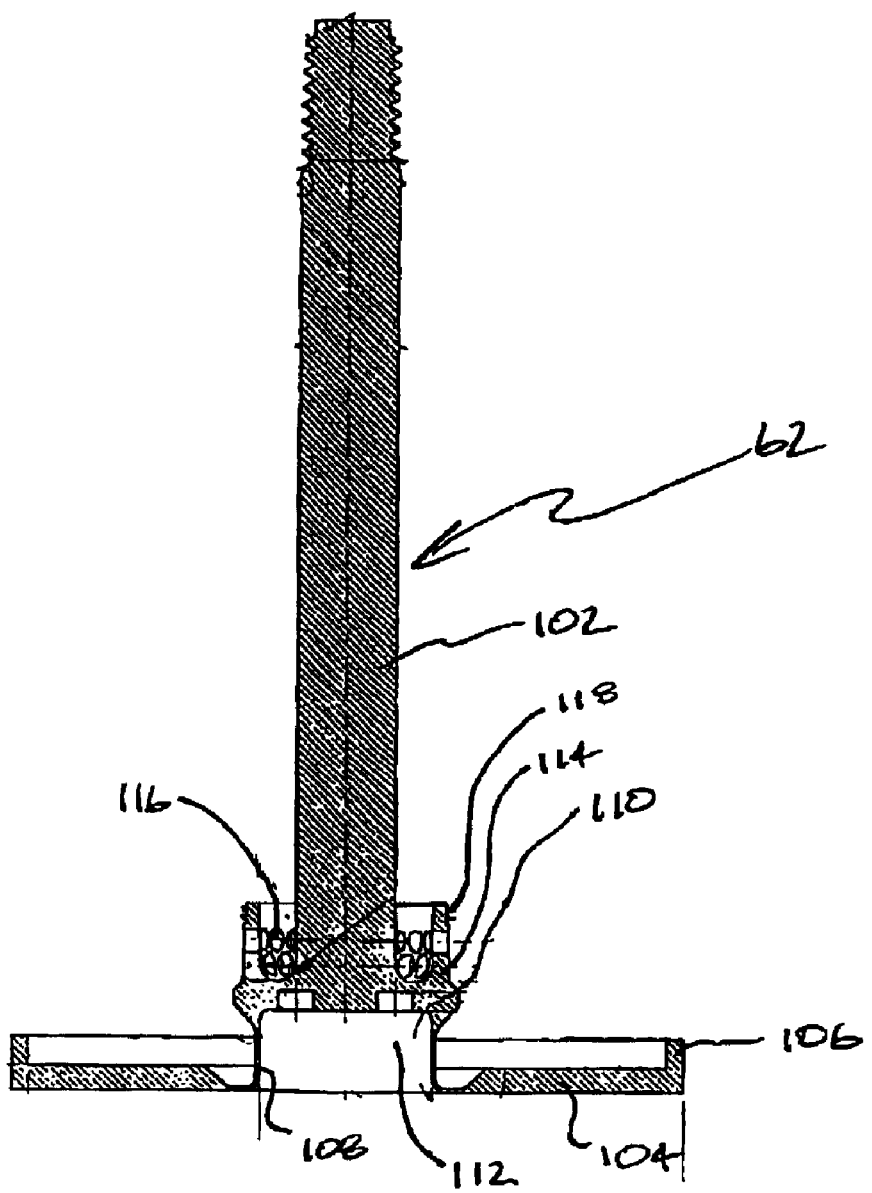
FIG. 4 is a cross-sectional side view of a poppet assembly from the regulator of FIGS. 1 and 2.

Referring back to FIG. 2, the poppet support 58 is interposed axially between the bottom cap 14 and the regulator body 12. The poppet assembly 62 is disposed within the body 12 and comprises a one-piece construction including a poppet shaft 102 having a flange 104 at a first axial end, that extends radially outwardly a distance therefrom, and a threaded opposite second axial end. Referring to FIGS. 2 and 4, the flange 104 is a generally disk-shaped member that is interposed axially between the body 12 and the poppet support 58. The flange includes an axially projecting tongue 106 positioned along its peripheral edge that is disposed within the groove 84 in the body shoulder 82. The tongue is sized having a thickness that is slightly larger than the groove width to provide a leak-tight interference fit therewith.

Moving radially inwardly from the flange 104, the poppet assembly includes a thin-walled section 108 that is interposed between the flange 104 and a centrally-positioned (relative to an axis running through the poppet shaft) poppet head 110. The thin-walled section 108 forms a transition portion of the poppet assembly and is configured to enable axial poppet movement, relative to a stationary flange 104, by a rolling action of the thin-walled section along an outside diameter surface of the spring containment member head 60. Accordingly, the poppet head 110 is configured having a recessed underside surface that is sized and configured to permit placement of the spring containment member head therein. Configured and arranged in this manner, the spring containment member head provides needed support for the thin-walled section 108 of the poppet to facilitate the above-described rolling poppet movement.

The poppet head 110 is sized having an outside diameter that is sufficiently larger than that of the body valve seat 90 to provide a desired leak-tight interface thereagainst when the poppet assembly is moved axially upwardly in the regulator body. In a preferred embodiment, the poppet head is configured having an outside surface that is tapered at a desired angle, e.g., a 45 degree angle, to interface with the valve seat. As mentioned briefly above, the groove 92 disposed around the valve seat enables the seat to deform slightly to accommodate full sealing contact between the poppet head and valve seat surfaces so as to ensure a leak-tight seal therebetween.

The poppet assembly includes a sleeve 114, moving axially away from the head 110, that extends concentrically around a portion of the shaft. The sleeve 114 includes plurality of orifices 116 that each extend from an outside surface of the sleeve therethrough to an annular space between the sleeve and the poppet shaft. The sleeve 114 also includes a sealing member 118 that is positioned adjacent an axial end of the sleeve, opposite the poppet head, that forms a leak-tight seal against a side wall portion of the fluid transport chamber 74. In an example embodiment, the sealing member is in the form of one or more lips that encircle the sleeve and that project radially outwardly a distance sufficient to ensure a leak-tight fit with the adjacent surface of the fluid transport chamber. In a preferred embodiment, the sealing member comprises a pair of such lips.

As best illustrated in FIG. 2, the plurality of orifices 116 through the sleeve are interposed axially between the poppet head 110 at one end, and the sealing member 118 at an opposite end, thereby enabling the passage of fluid into the fluid transport chamber when the poppet assembly is sufficiently retracted within the body to cause the head to be unseated from the valve seat. As better described below, the sealing member is configured in this manner to eliminate by-pass flow between the sleeve and fluid transport chamber, thereby forcing fluid within the regulator to be passed through the plurality of orifices. This feature is important for the purpose of eliminating or greatly reducing undesired harmonic oscillation and resulting chattering of the poppet during regulator operation.

The poppet shaft 102 projects axially away from the poppet head, and is disposed through the fluid transport chamber 74. The poppet shaft 102 projects outwardly from the fluid transport chamber and into a diaphragm chamber 120 formed within the diaphragm housing 16. As illustrated in FIG. 2, the diaphragm housing 16 is attached at a first housing end 122 by threaded connection with the regulator body second axial end 78. The diaphragm chamber 120 is in fluid flow communication with the fluid transport chamber 74. The diaphragm housing includes a tongue 124 that projects axially outwardly from a circular edge of the diaphragm chamber, and that is disposed within a complementary groove positioned inside of the regulator body 12.

The groove is preferably sized having a width that is slightly smaller than the thickness of the tongue to provide a leak-tight interference fit therebetween.

The diaphragm chamber is configured having a tapered decreasing-diameter cross section, moving axially into the diaphragm housing from the regulator body. The diaphragm chamber 120 has a minimum diameter section that is defined by a neck 126. Moving axially away from the neck 126, the diaphragm chamber extends radially outwardly to define a flared section 128 having a maximum diameter that is defined by an inside wall surface 130. As described below, the flared section 128 is configured to accommodate placement of a diaphragm therein.

A diaphragm 132 is positioned within the diaphragm housing 16 and is attached at a central position to the poppet shaft axial end. The diaphragm is in the form of a generally disk-shaped member. In an example embodiment, the diaphragm 132 comprises an opening 134 that is positioned centrally within a backside surface, and that extends only partially therein. The opening 134 includes a threaded sidewall that is configured to complement a threaded surface of the poppet shaft axial end. Configured in this manner, the diaphragm and shaft are thereby attached by threaded connection.

The diaphragm 132 is interposed axially between the diaphragm housing 16 and a top cap 135 that is positioned into the housing via a housing open end 137. The top cap is sized and configured to fit into the housing while maintaining a desired amount of room within the housing to accommodate desired axial diaphragm movement. The diaphragm includes movable thin-walled sections 136 that project radially outwardly away therefrom, and that are configured to be fixedly attached to opposed housing and top cap surfaces. In an example embodiment, the thin-walled sections 136 extend radially outwardly from the diaphragm and each comprise an axially projecting tongue 138 that defines a peripheral edge of the diaphragm. The tongues 138 of each respective thin-walled section 136 project axially in opposite directions, and are disposed within grooves that are recessed into opposed housing and top cap surfaces. In such example embodiment, a spacer 140 is interposed between the opposed tongues 138 of the thin-walled sections to ensure positive engagement of the tongues within their respective grooves, and to provide leak detection between the two sections. In a preferred embodiment, the tongues are sized having a thickness that is slightly greater than the width of the grooves to provide a desired leak-tight interference fit therewith.

The top cap 135 is held in place over the regulator housing 16 by use of an annular ring 142 that is configured to fit over an outer edge portion of the top cap and provide a threaded interface with a wall section of the regulator housing. The annular ring 142 includes a reduced diameter section that is sized to fit over an end of the top cap and retain attachment of the top cap with the regulator body by threaded connection between the ring and body. Together, the attached top cap and body provide a closed diaphragm chamber that comprises a first volume 144 above the diaphragm, i.e., interposed between a top surface of the diaphragm and an inside surface of the top cap, and a second volume 146 below the diaphragm, i.e., interposed between a bottom surface of the diaphragm and an inside surface of the regulator body.

The example regulator illustrated in FIG. 2 is one having a fluid output pressure set point that is pneumatically controlled. Thus, the top cap 135 is configured having an air supply port 148 that passes through the cap and into the first open space 144. As discussed below, the air supply port is provided for purposes imposing a pneumatic pressure onto the diaphragm to provide a desired fluid outlet pressure. It is, however, to be understood that variable flow regulators of this invention can be configured to operate using other conventional types of set point control means. For example, instead of using pneumatic control means, variable flow regulators of this invention can be configured to use a mechanical control means, i.e., a spring means, that imposes a desired pressure onto the diaphragm to provide a desired fluid outlet pressure.

The above-described and illustrated variable flow regulator functions in the following manner to provide a fluid outlet at variable flowrates having a defined output pressure. Referring to FIGS. 1, 2 and 3, fluid enters the regulator body 12 via the fluid inlet port 18 and passes via the fluid inlet passage 88 into a fluid chamber 150 within the body that is positioned upstream from the valve seat 90 and fluid transport chamber 74. The entering fluid is provided at a supply pressure that is greater than a desired fluid outlet pressure. A set point air pressure is directed through the regulator top cap 135 via the air supply port 148, and into the first open space 144.

Initially, the set point pressure of the air is greater than the pressure of fluid in fluid chamber 146, thereby creating a downwardly directed differential pressure on the diaphragm, which causes the poppet assembly 62 to be moved axially downwardly in the regulator. This downward movement causes the poppet head 110 to become unseated from the valve seat 90, allowing the entering fluid to flow into the fluid transport chamber 74 and upwardly into the diaphragm chamber 120.

Due to the configuration of the poppet, comprising the plurality of orifices 116 and the sealing member 1 18, the entering fluid enters the fluid transport chamber via passage through the plurality of orifices 116 rather than by passage between the poppet head and valve seat. This feature is significant in that the plurality of orifices are sized and configured to eliminate any undesired harmonic oscillation that is known to occur within conventional regulators during fluid flow.

The fluid entering the fluid transport chamber 74 fills the diaphragm housing and imposes an upwardly directed pressure onto a backside surface of the diaphragm 132, counteracting to some extent the downwardly directed set point air pressure on the diaphragm. Once the poppet head is unseated from the valve seat, fluid flows both into the diaphragm housing and out of the regulator via the fluid outlet passage 100 and outlet port 20, which are each in fluid flow communication with the fluid transport chamber 74 and disposed downstream of the valve seat 90. The pressure differential imposed on the diaphragm acts, with the spring assembly, to control the passage of fluid through the regulator at different or variable flowrates to provide a desired fluid outlet pressure.

If desired, the regulator can be configured having leak detection capability, wherein fluid leaking past a damaged or worn poppet thin-walled portion 108 and between the annular poppet support 58 and spring containment member 52, is directed through the spring containment member fluid passage 70 and into leak detection port 72 running through the body. A leak detection system can be attached to the body leak detection port 72 for monitoring the regulator for any internal fluid leakage.

A feature of variable flow regulators of this invention is the use of a one-piece poppet assembly comprising the plurality of orifices interposed between the poppet head and the sleeve sealing member. The use of such poppet serves to control and direct fluid flow through the regulator in a manner that eliminates undesired harmonic poppet and valve seat oscillation during low or high fluid flow rates. Another feature of variable flow regulators of this invention is the construction of the poppet assembly comprising a thin-walled portion that enables axial poppet movement via rolling movement that does not appreciably affect the surface area of the poppet to the fluid within the regulator as the poppet is stroked. A further feature of variable flow regulators of this invention is the configuration of the poppet sleeve sealing member that both directs fluid flow through the plurality of orifices, and that is specially configured to provide a zero leakage seal having low sealing resistance.

Another feature is the complete containment of the springs, by the spring containment member 52, within the regulator to avoid possible contact between any leaking fluid and the metal springs, thereby eliminating the potential for fluid contamination. A still other feature of regulators of this invention is the use of tongue-in-groove seals throughout, forming leak-tight seals with wetted or possibly wetted regulator members. Such tongue-in-groove seals operate to both minimize the number of possible leak paths through the regulator, and to minimize unwanted fluid holdup volume within the regulator.

Materials used to construct variable flowrate regulators of this invention can vary depending on intended use application. For non-critical applications, e.g., whether the fluid being transported is not an aggressive chemical and/or is not high purity, the various members making up the regulator can be formed from conventional structural materials known for making conventional regulators, e.g., polymeric materials and/or metals. However, for use in the application of making semiconductors, where aggressive chemicals and/or high purity chemicals are used, it is desired that the wetted members of the regulator be formed from a fluoropolymeric material selected from the group including polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), polyvinyl fluoride (PVF) and the like.

In a preferred embodiment, wherein the regulator is used in such semiconductor processing operation, the wetted parts such as the poppet assembly, regulator body, diaphragm, and diaphragm housing are each formed from such a fluoropolymeric materials. The non-wetted parts comprising the inner and outer spring guides, spring containment member, poppet support, bottom cap, top cap, and annular ring can each be formed from a polymeric material such as polypropylene or the like. The regulator members can be formed by machining or molding process depending on the specific types of material chosen, the particular manufacturing capabilities, and the project budget.

Accordingly, it is to be understood that, within the scope of the appended claims, variable flow regulators, constructed according to principles of this invention, may be embodied other than as specifically described herein.

What is claimed is:

1. A fluid pressure regulator comprising:
   a regulator body having a fluid transport chamber disposed therethrough, fluid inlet and outlet ports in fluid flow communication with the chamber, and a valve seat positioned at one end of the chamber;
   a diaphragm housing attached to the body and having a diaphragm chamber in fluid flow communication with the fluid transport chamber;
   a diaphragm disposed within the diaphragm chamber;
   a one-piece poppet assembly attached to the diaphragm and disposed within the body, the poppet assembly comprising:
      a head having a diameter greater than the valve seat for providing a leak-tight seal thereagainst when placed in a closed position;
      a plurality of orifices positioned adjacent the head for passing fluid into the fluid transport chamber when the head is unseated from the valve seat, the plurality of orifices being positioned concentrically within the fluid transport chamber; and
   means for controlling the diaphragm and poppet assembly to produce a desired outlet fluid pressure.

2. The regulator as recited in claim 1 wherein the poppet assembly further comprises:
   a shaft having one of its axial ends attached to the diaphragm;
   a flange that extends radially outwardly from an axial end of the shaft opposite the diaphragm and that is fixedly attached to the body;
   a thin-walled section extending radially inwardly from the flange to the head for facilitating axial poppet displacement within the regulator by rolling movement;
   a sleeve extending axially away from the head and being concentrically positioned around a portion of the shaft, the sleeve being disposed within the fluid transport chamber and comprising the plurality of orifices.

3. The regulator as recited in claim 2 wherein the poppet assembly further comprises a sealing member positioned adjacent the orifices for providing a seal within the fluid transport chamber, wherein the plurality of orifices are interposed between the head and the sealing member.

4. The regulator as recited in claim 3 wherein the sealing member comprises one or more radially projecting lips that are positioned circumferentially around an outside surface of the sleeve.

5. The regulator as recited in claim 1 further comprising a spring assembly for imposing a spring force onto the poppet assembly to place the head into sealing engagement with the valve seat during fail-closed operation.

6. The regulator as recited in claim 5 further comprising:
   a bottom cap attached to an end of the body opposite the diaphragm housing, the bottom cap including a central chamber that is positioned adjacent the fluid transport chamber, wherein the spring assembly is disposed within the central chamber and is in contact with the poppet assembly;
   wherein the poppet flange is interposed between the body and the bottom cap, and forms a leak-tight seal therebetween.

7. The regulator as recited in claim 5 wherein the spring assembly comprises:
   one or more springs extending axially within the central chamber;
   a spring containment member disposed over the one or more springs to encapsulate the same, the spring containment member including an axially projecting head that is in contact with an underside surface of the poppet head.

8. The regulator as recited in claim 7 wherein the spring assembly further comprises:

an inner spring guide disposed concentrically within an innermost of the one or more springs; and an outer spring guide interposed between an outermost of the one or more springs and the spring containment member.

9. The regulator as recited in claim 5 further comprising an annular poppet support disposed concentrically around the spring assembly.

10. The regulator as recited in claim 1 wherein the poppet assembly and the regulator body are each formed from a fluoropolymeric material.

11. A variable flow regulator comprising:

a regulator body comprising a fluid transport chamber extending therethrough between opposite axial ends of the body, the body including a fluid inlet port and a fluid outlet port each in fluid flow communication with the chamber, the chamber including a circular valve seat positioned at and integral with an axial chamber end;

a one-piece poppet assembly disposed within the body and comprising:

a shaft running axially through the chamber; a radially extending flange integral with an axial end of the shaft;

a thin-walled section integral with the flange and extending axially toward the shaft;

a head integral with the thin-walled section having a diameter slightly larger than the valve seat; and a sleeve integral with the head and extending concentrically along a portion of the shaft, the sleeve comprising a plurality of orifices disposed therethrough, and a sealing means along an outside sleeve surface to form a seal against an inside surface of the chamber;

a diaphragm housing attached to an axial end of the body and comprising a diaphragm chamber disposed therein, the diaphragm housing being in fluid flow communication with the fluid transport chamber;

a diaphragm attached to an axial end of the poppet shaft opposite the flange, the diaphragm being disposed within the diaphragm chamber; and means for imposing a set point pressure onto one surface of the diaphragm to control axial movement of the diaphragm and poppet assembly within the regulator during regulator operation to provide a desired fluid output fluid pressure.

12. The regulator as recited in claim 11 further comprising:

a bottom cap attached to an axial end of the body opposite from the diaphragm housing, the bottom cap including a central chamber that is positioned adjacent the fluid transport chamber; and a spring assembly disposed within the central chamber and in contact with the poppet assembly; wherein the poppet flange is interposed between the body and the bottom cap, and forms a leak-tight seal therebetween.

13. The regulator as recited in claim 12 wherein the spring assembly comprises: one or more springs extending axially within the central chamber; and a spring containment member disposed over the one or more springs to encapsulate the same, the spring containment member including an axially projecting portion that is in contact with an underside surface of the poppet head.

14. The regulator as recited in claim 13 wherein the spring assembly further comprises:

an inner spring guide disposed concentrically within an innermost of the one or more springs; and an outer spring guide interposed between an outermost of the one or more springs and the spring containment member.

15. The regulator as recited in claim 13 wherein the spring containment member comprises:

an imperforate head that is in contact with an underside surface of the poppet head; a generally cylindrical sidewall extending axially away from the imperforate head and including a thin-walled portion; and a flange extending radially away from the sidewall thin-walled portion, the flange including a tongue projecting axially outwardly therefrom, the flange being interposed between opposed surfaces of the bottom cap and the poppet support, and the tongue being disposed within a recessed groove in the poppet support to provide a leak-tight seal therewith.

16. The regulator as recited in claim 12 further comprising an annular poppet support disposed concentrically around the spring assembly, wherein the poppet flange is interposed between opposed surfaces of the poppet support and the regulator body.

17. The regulator as recited in claim 12 wherein the poppet flange includes a tongue that projects axially therefrom and that is disposed within a recessed groove in the body to form a leak-tight seal therebetween.

18. The regulator as recited in claim 12 wherein the poppet assembly and the regulator body are each formed from a fluoropolymeric material.

19. The regulator as recited in claim 12 wherein the poppet sealing means is in the form of one or more lips disposed in circular fashion around the sleeve and that each project radially a distance away from the sleeve.

20. The regulator as recited in claim 12 wherein the body further comprises a recessed groove disposed concentrically around the valve seat.

21. A variable flow regulator comprising:

a regulator body comprising a fluid transport chamber extending therethrough between opposite body axial ends, the body including a fluid inlet port and a fluid outlet port each in fluid flow communication with the chamber, the chamber including a circular valve seat positioned at one chamber end;

a bottom cap attached to an axial end of the body adjacent the valve seat, the bottom cap comprising a central chamber that is positioned adjacent the fluid transport chamber; a diaphragm housing attached to an axial end of the body opposite the bottom cap, the diaphragm housing comprising a diaphragm chamber that is in fluid flow communication with the fluid transport chamber;

a one-piece poppet assembly disposed within the body, cap and housing, the poppet assembly comprising:

a shaft running axially through the fluid transport chamber;

a flange integral with an axial end of the shaft positioned adjacent the cap and extending radially outwardly therefrom; a thin-walled section integral with the flange and extending radially inwardly and axially towards the shaft;

an imperforate head integral with the thin-walled section and having a diameter slightly larger than the valve seat, the head being positioned adjacent the valve seat for providing a leak-tight seal thereagainst; and a sleeve integral with the head and extending axially therefrom, the sleeve having a diameter less than the head and extending concentrically around a portion of the shaft, the sleeve being at least partially disposed within the fluid transport chamber and comprising a plurality of orifices disposed therethrough; and a sealing means along an outside sleeve surface to form a seal against an inside surface of the fluid transport chamber, wherein the plurality of orifices are interposed axially along the sleeve between the head and the sealing means;

a diaphragm attached to an axial end of the poppet shaft opposite the flange, the diaphragm being disposed within the diaphragm chamber; and means for controlling the diaphragm and poppet assembly movement with the regulator during regulator operation to provide a desired output fluid pressure.

22. The regulator as recited in claim 21 wherein the poppet flange includes a tongue positioned along a peripheral edge that extends axially therefrom and that is positioned within a recessed groove in the body to provide a leak-tight seal therebetween.

23. The regulator as recited in claim 21 wherein the means for controlling comprises a top cap attached to the regulator body and forming a closed volume between top cap and an adjacent diaphragm surface, the top cap comprising an air supply port for providing a set point air pressure to the close volume and imposing a resulting pressure onto the diaphragm surface.

24. The regulator as recited in claim 21 further comprising a spring assembly disposed within the central chamber and in contact with the poppet assembly for imposing a biasing spring pressure thereagainst.

25. The regulator as recited in claim 24 wherein the spring assembly comprises: one or more springs extending axially within the central chamber; and an axially moveable spring containment member disposed over the one or more springs to encapsulate the same, the spring containment member including an axially projecting portion that is in contact with an underside surface of the poppet head.

26. The regulator as recited in claim 25 wherein the spring assembly further comprises a spring guide means positioned concentric and in axial alignment with the one or more springs.

27. The regulator as recited in claim 25 wherein the spring containment member comprises:

an imperforate head that is in contact with an underside surface of the poppet head; a generally cylindrical sidewall extending axially away from the head, the sidewall including an axially movable thin-walled portion; and a flange extending radially outwardly away from the sidewall, the flange including an axially projecting tongue, the flange being interposed between opposed surfaces of the bottom cap and the poppet support, the containment member flange tongue being disposed within a recessed groove in the poppet support to provide a leak-tight seal therewith.

28. The regulator as recited in claim 24 further comprising an annular poppet support disposed concentrically around the spring assembly and within the central chamber, wherein the poppet flange is interposed between opposed surfaces of the poppet support and the regulator body.

29. The regulator as recited in claim 21 wherein the poppet assembly and the regulator body are each formed from a fluoropolymeric material.

30. The regulator as recited in claim 21 wherein the poppet sealing means is in the form of one or more lips disposed in circular fashion around the sleeve, and that each project radially a distance away from the sleeve.

31. The regulator as recited in claim 21 wherein the body further comprises a recessed groove disposed concentrically around the valve seat.

* * * * *